United States Patent
Delia et al.

(10) Patent No.: US 6,915,333 B2
(45) Date of Patent: Jul. 5, 2005

(54) METHOD OF MANAGING ATTACHED DOCUMENT

(75) Inventors: Wayne M. Delia, Poughkeepsie, NY (US); William A. Ma, Wappingers Falls, NY (US); William Hsioh-Lien Ma, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 10/017,188

(22) Filed: Dec. 14, 2001

(65) Prior Publication Data

US 2003/0115273 A1 Jun. 19, 2003

(51) Int. Cl.$^7$ .............................................. G06F 13/00
(52) U.S. Cl. ...................... 709/206; 709/203; 709/217; 709/219
(58) Field of Search ................................ 709/200–203, 709/206–207, 217–220

(56) References Cited

U.S. PATENT DOCUMENTS

| | | | |
|---|---|---|---|
| 5,418,908 A | | 5/1995 | Keller et al. |
| 5,771,355 A | | 6/1998 | Kuzma |
| 5,781,901 A | | 7/1998 | Kuzma |
| 5,903,723 A | | 5/1999 | Beck et al. |
| 6,009,462 A | | 12/1999 | Birrell et al. |
| 6,018,761 A | | 1/2000 | Uomini |
| 6,058,428 A | | 5/2000 | Wang et al. |
| 6,076,111 A | | 6/2000 | Chiu et al. |
| 6,092,101 A | | 7/2000 | Birrell et al. |
| 6,185,551 B1 | | 2/2001 | Birrell et al. |
| 6,453,338 B1 | * | 9/2002 | Shiono ........................ 709/206 |
| 6,505,236 B1 | * | 1/2003 | Pollack ........................ 709/206 |
| 6,745,197 B2 | * | 6/2004 | McDonald ................... 707/102 |
| 6,820,081 B1 | * | 11/2004 | Kawai et al. .................. 707/7 |
| 2002/0065892 A1 | * | 5/2002 | Malik .......................... 709/206 |

FOREIGN PATENT DOCUMENTS

| | | |
|---|---|---|
| JP | 10222438 | 8/1998 |
| JP | 2000194617 | 7/2000 |

OTHER PUBLICATIONS

Research Disclosure No. 429175. *Mail Server Storage Economizer Working Across User Email Accounts*. Disclosed by International Business Machines Corporation.

* cited by examiner

Primary Examiner—Moustafa M. Meky
(74) Attorney, Agent, or Firm—DeLio & Peterson, LLC; James J. Cioffi; Kelly M. Reynolds

(57) ABSTRACT

A method for managing e-mail attachment files received via a network e-mail system by a user. A first e-mail is received at a client computer which includes a first attachment file from the network e-mail system. The client computer begins searching for a second attachment file included with a second e-mail file, preferably automatically after opening the first e-mail. The files are compared to determine if the first attachment file is another incidence of the second attachment file. If true, the method replaces the first attachment file with an identification which points to the second attachment file. When deleting the second e-mail file, the method searches for a third e-mail file. If the third e-mail file is found and the third e-mail file is the next earliest dated incidence of the second e-mail file, the method provides moving and attaching the second attachment file to the third e-mail file.

18 Claims, 5 Drawing Sheets

METHOD OF MANAGING ATTACHED DOCUMENT

BACKGROUND OF THE INVENTION

1. Field of the Invention

The present invention relates to a method of managing attachment files received in an e-mail via a network, and more particularly, to a method of managing attachment files from a client computer wherein the attachment files are received in an e-mail via a network.

2. Description of Related Art

Typical attachment management methods for filtering mail messages or attachment to e-mails include methods and apparatus for storing transmitted e-mail attachments using a network and mail service system via a network. An attachment having a unique network address can be stored on a network server or computer local to a sender. Attachment references may be generated comprising the network address of the attachment where the attachment reference is accessible by an e-mail recipient. The sender of the message stores the attachment locally while the recipient of the message retrieves the attachment via the internet from its position local to the sender using the sender's URL.

Another known attachment management method includes storing an attachment on a network or other means visible to the network and local to a sender where the attachment has a unique network address. The process then generates an attachment reference comprising the network address of the attachment and attaching the attachment referenced to a primary e-mail message which is sent from a sender. Once the sender sends the primary e-mail message and the attachment reference from the sender to a recipient, the recipient is informed that the attachment is attached to the primary e-mail message. A retrieval of the attachment occurs by the recipient retrieving the attachment from the storage means or network when the recipient chooses to access the attachment.

Another known process for attachment management includes storing mail messages and message files of a mail service system. A new mail message is compared to the stored message using a filter query. The new mail message received by the mail service system from a client computer is parsed and indexed. A box label and unread label is added to the new mail message if the contents of the new mail message do not match the stored mail message.

Another known attachment management process includes transmitting e-mails over a network. The process consists of a node in the network receiving an e-mail message to be distributed to a recipient. The e-mail message includes an attachment reference comprising the network address of an attachment stored locally in relation to a network. A copy of the attachment is retrieved, and stored locally in reference to the network. The method includes transmitting e-mail over a network where a node in the network receives an e-mail message which is distributed to other nodes. The e-mail message includes an attachment reference which comprises the network address of the attachment stored locally at the previous node in the network. The method compares the expected cost of moving the attachment from the previous node to the new recipient, with the cost of moving the attachment locally to the user.

Another known attachment management process includes transmitting a primary e-mail message and attachment to a remote PC. The attachment is stored in a file server but is visible through the internet. An attachment reference is generated which comprises a URL (uniform resource locator) pointer to the location of the attachment in the HTTP (hypertext transfer protocol) server. The e-mail message with the attachment reference can then be transmitted to the recipient PC (personal computer) using the internet in the standard manner and the PC may use the attachment reference to access the attachment when desired.

Other known attachment management processes include a method for downloading mail messages in a distributed computer system such as the internet. The computer system includes a plurality of client computers connected to a mail service system via a network. A mail message is stored in the mail service system, where the mail message includes a primary component encoded in a first format, and a secondary component encoded in a second format. A client computer requests one of the stored mail messages, or the secondary component. The attachment is replaced with a hot-link and the message is sent over a network connection including the hot-link to the particular client computer, minus the attachment.

A disadvantage of known e-mail attachment systems is the lack of comparison and indexing between the incoming and existing files. Managing attachments and files typically includes a desire to compare files and attachments to determine the most current file or attachment. Mistakenly deleting or using the wrong file or attachment, such as an out-of-date file when a more recent version of the file is desired, can be deleterious to productivity.

More specifically, current e-mail attachment methods lack the means for eliminating duplicate attachments received from e-mails while providing a means for maintaining an association between the e-mail and the attachment. This disassociation between the e-mail and attachment causes a problem when a user deletes the e-mail or the attachment component by removing needed data in the attachment and/or removing an explanatory e-mail.

Further, another disadvantage of known e-mail attachment systems is the lack of addressing the problem stemming from deleting an attachment or an e-mail message including an attachment having directed to it multiple hot-links or pointers. Deletion of such an attachment can cause multiple users loss of valuable data contained in the attachment, inconvenience in retrieving the data, and loss of user productivity.

Additionally, multiple copies of e-mail attachments can consume significant amounts of server or client computer storage space. Once the e-mail with attachment is sent to multiple recipients, a server based e-mail system may experience significant loss of available storage space by multiple copies of the same e-mail. Additionally, often users send notes or e-mail back and forth on the same subject matter, or forward to another user who in turn, forwards to another user. This multiple forwarding and back and forth messages with reply messages can include the original attachment which is then being sent over the network consuming bandwidth, and significant storage space on a server or computer on which the message is received. Further, this problem can be worsened when attachments increase in size. Moreover, recipients of larger e-mail messages who then forward the entire e-mail including the attachment can significantly affect available bandwidth throughout the network for other clients.

Bearing in mind the problems and deficiencies of the prior art, it is therefore an object of the present invention to provide a method for eliminating multiple incidences of an attachment while maintaining the attachments association with its e-mail.

It is another object of the present invention to provide a method for eliminating duplicate attachments while checking for associated e-mails of the attachment.

A further object of the present invention is to provide a method which searches for the existence of the duplicate attachments and other incidences of the attachment's e-mail.

It is yet another object of the present invention to provide a method for reducing the amount of storage space in which attachments use on a computer while maintaining the association between an attachment and e-mail.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for managing e-mail attachment files by a user received via a network e-mail system which includes in one embodiment selecting at least one option from a menu displayed at the client computer before receiving an e-mail with an attachment. In another embodiment, the user receives at a client computer a first e-mail including a first attachment file from the network e-mail system. The first e-mail is opened at the client computer, which may in a preferred embodiment, automatically initiate proceeding with the remainder of the steps in the method for managing e-mail attachment files. After opening the first e-mail file, the user may select to proceed with the remainder of the steps of the method for managing e-mail attachment files. The first attachment file of the first e-mail is compared with at least one existing second attachment file of the second e-mail file. It is determined whether the first attachment file is another incidence of the second attachment file which may include evaluating a date, a file name, and a file size for both the first attachment file and the second attachment file. The first attachment file is replaced, which may require authorization, with an identification which points to the second attachment file when the first attachment file is another incidence of the second attachment file. A reference tag is attached to the second attachment file indicating a file system location of the second attachment file. The method searches for a third e-mail file being a next earliest dated incidence of the second e-mail file when deleting the second e-mail file. There may be an option to select at the client computer to proceed to the next step of moving and attaching, when the third e-mail is found. After the second e-mail file is deleted, the method moves and attaches the second attachment file to a third e-mail file being the next earliest dated incidence of the second e-mail file. The second attachment file may be deleted after not finding the third e-mail file to be a next earliest dated incidence of the second e-mail file. The first attachment file of the first e-mail file may be saved when the first attachment file is not another incidence of the second attachment file. In another preferred embodiment of the present invention, the menu may include a first option which provides saving all attachments. In another preferred embodiment, a second option is provided for replacing the first attachment with the pointer to the second attachment when the first attachment file is another incidence of the second attachment file and the first attachment file is greater than about 0.5 MB.

In another aspect of the present invention, the method for managing e-mail attachment files received via a network e-mail system by a user includes selecting an option from an option menu at the client computer. Then receiving at a client computer, a first e-mail including a first attachment file from the network e-mail system. The first e-mail is opened from the client computer, and in a preferred embodiment the user selects to proceed with the remainder of the steps of the method for managing e-mail attachment files. The method searches for a second attachment file included with a second e-mail file automatically after opening the first e-mail. The first attachment file is compared with the second attachment file. The method determines whether the first attachment file is another incidence of the second attachment file. In a preferred embodiment, the user may authorize at the client computer saving and deleting first and second attachment files and replacing the first and second attachment files with the identification. The first attachment file is replaced with an identification which points to the second attachment file when the first attachment file is another incidence of the second attachment file. A reference tag is attached to the second attachment file indicating a file system location of the second attachment file. A third e-mail file is searched for being a next earliest dated incidence of the second e-mail when deleting the second e-mail file. The user may select at the client computer the option of proceeding to the next step of, moving and attaching, when the third e-mail is found. When the third e-mail file is found and the third e-mail file is the next earliest dated incidence of the second e-mail file and after the second e-mail file is deleted, the second attachment file is moved and attached to the third attachment file. The second attachment file may be deleted after not finding the third e-mail file being a next earliest dated incidence of the second e-mail file. The first attachment file included with the first e-mail file may be saved when the first attachment file is not another incidence of the second attachment file.

In a related aspect, opening the first e-mail may automatically initiate proceeding with the remainder of the steps in the method for managing e-mail attachment files.

In another related aspect the steps are performed in the sequence provided.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1A:
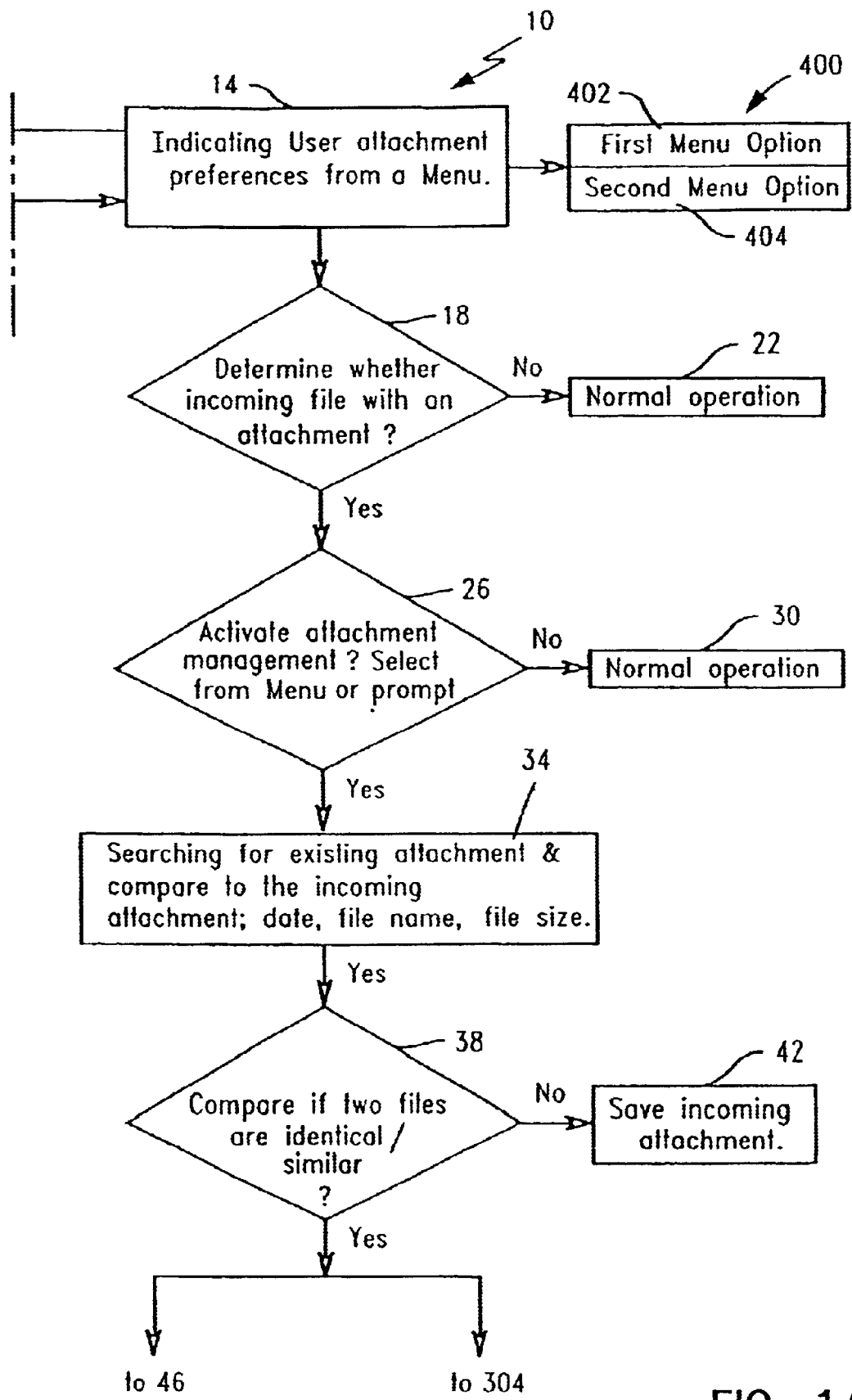
FIG. 1A is a flow chart of a preferred embodiment of the present invention.

In describing the preferred embodiment of the present invention, reference will be made herein to FIGS. 1A–3 of the drawings in which like numerals refer to like features of the invention. Features of the invention are not necessarily shown to scale in the drawings.

Figure 1B:
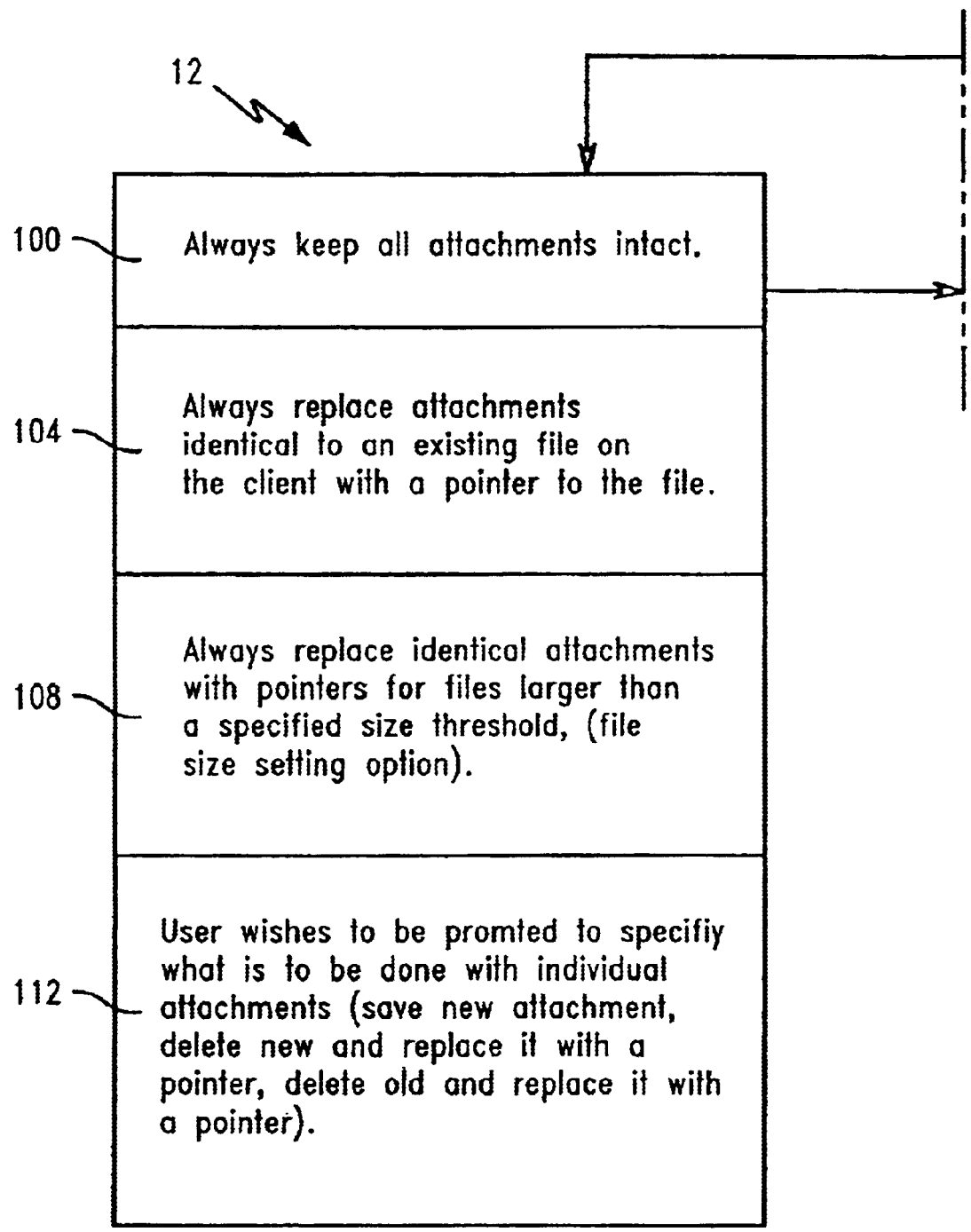
FIG. 1B depicts sub-steps of the first step of the flow chart shown in FIG. 1A.
Figure 1C:
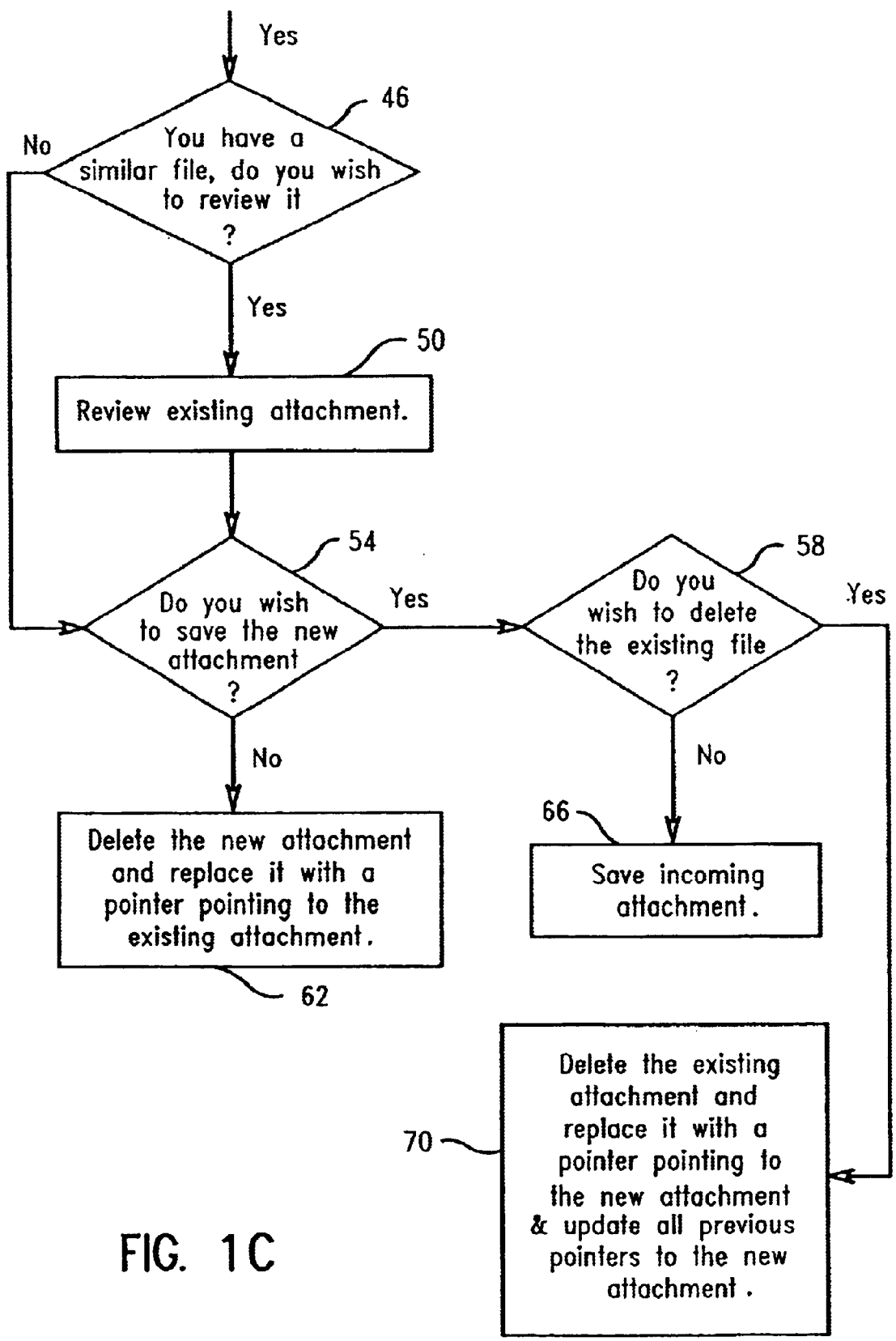
FIG. 1C is a flow chart which is a continuation of the flow chart shown in FIG. 1A.

The preferred embodiment 10 shown in FIGS. 1A–1C, includes a first step 14 where a user at a first client computer 204 determines a plurality of attachment preferences 12 detailed in FIG. 1B. The attachment preference 12 includes a plurality of sub-steps 100–112 which may be displayed as a menu on the user's computer. A first attachment preference or option 100 includes choosing to always keeping attachments intact. Another attachment preference 104 includes replacing attachments identical to an existing file on the first client's computer 204 with a pointer to the file. Another attachment preference 108 comprises a file size setting option which includes replacing identical attachments with pointers for files larger than a specified size threshold, for example, files greater then 0.5 megabytes. Another preference 112 includes prompting the user with options specifying what to do with individual attachments, for example, saving new attachments, deleting new attachments, and replacing new attachments with a pointer, or deleting an old replacement and replace it with a pointer.

Figure 2:
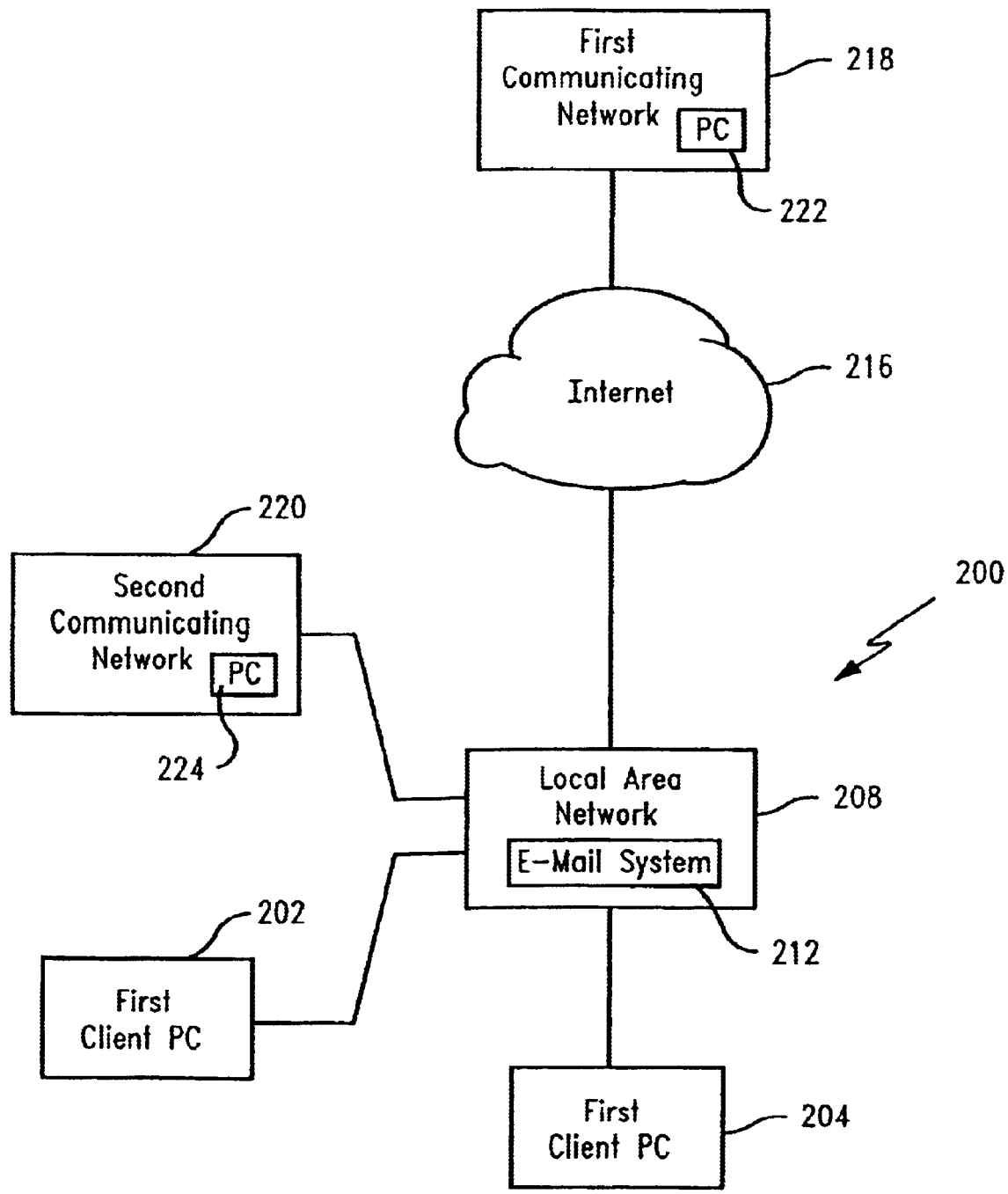
FIG. 2 is a diagram of a client's computer connected to a network having an e-mail system as in the present invention.

Step 18 determines whether an incoming file includes an attachment. As shown in FIG. 2, the incoming file and attachment may be sent from a second client PC 202 to the first client PC 204 on the same local area network 208 using the e-mail system 212. A third client PC 222 on another network 218 communicating with the local area network 208 provides a wide area network via the internet 216. A fourth client PC 224 on another communicating network 220 may interact with the local area network 208 through alternative means bypassing the internet, such as using a direct communications line. If the incoming file does not include an attachment, then the method proceeds to the next step 22 which is to return to normal operation. If the incoming file does include an attachment, then the next step 26 is to activate the attachment management utility. The user can optionally select from a menu whether the attachment management program be activated 26, or to proceed with normal operation 30. Additionally, the user may initially select an option from a menu 400 which provides a first menu option 402 which includes that upon the opening of an e-mail file having an attachment, the attachment management program is activated. A second menu option 404 includes the option of proceeding sequentially with the remaining steps in the method for managing attached documents. When the attachment management utility is not activated the next step 30 in the method is to proceed to normal operation. However, when the attachment management utility is activated the next step 34 is to search for existing attachments and compare the existing attachments to the incoming attachment. The comparison preferably includes the dates, file names, and file sizes between the incoming attachment and all other attachments, to discover other incidences of the incoming attachment.

Figure 3:
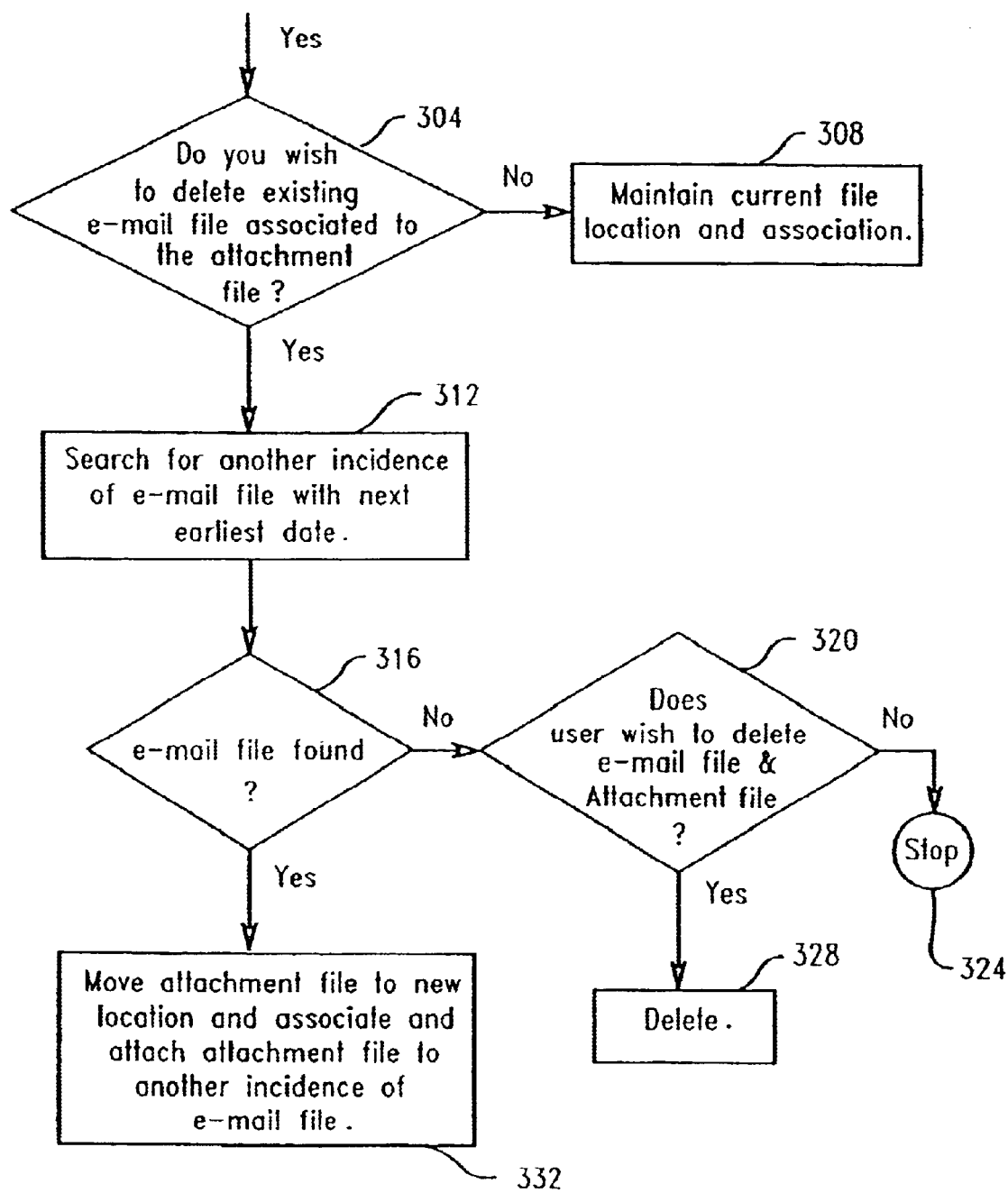
FIG. 3 is a flow chart which is a continuation of the flow chart shown in FIG. 1A.

When the method of the present invention finds two of the same attachment files (another incidence of the incoming attachment file) then the method may proceed to the next step 46, shown in FIG. 1C, or the next step 304, shown in FIG. 3. If the method does not find two of the same attachment files then the next step 42 is to save the incoming attachment file.

Referring to FIG. 1C, the next step 46 includes the user determining whether to review the attachment file when it is a second incidence of an existing attachment file. If the user chooses to review the similar file, then the next step is for the user to review the existing incidence of the attachment file 50. If the user does not want to review the file, the method proceeds to the next step 54 which prompts whether to save the new attachment.

If the user does not wish to save the new attachment file the method proceeds to the next step 62 where the new attachment file is deleted and replaced with an identification or pointer which points to the existing attachment file which is another incidence of the new attachment file. Further, a reference tag is added to the attachment file indicating the location of the attachment file. Preferably, the reference tag and pointer include information such as file location, file size, file time stamp for generating the file and for receiving the file.

If the user wishes to save the new attachment, then the method proceeds to the next step 58 which prompts for a response as to deleting the existing attachment file. If the user does not wish to delete the existing file, the method proceeds to the next step 66 and saves the incoming attachment file. If the user does wish to delete the existing file, the method proceeds to the next step 70 where the existing attachment file is deleted and replaced with a pointer to the new attachment file and all previous pointers are updated to point to the new attachment file. Additionally, a reference tag is added to the attachment file indicating the location of the attachment file.

Additionally, referring to FIG. 3, after step 38 the method may proceed to step 304 of the method of the present invention which includes moving the existing attachment file to another location, when the e-mail file which the existing attachment file is associated with is deleted. The move to a second location includes attaching the existing attachment file to another occurrence of the e-mail having the next most current date, or the next closest date to the existing e-mail which is to be deleted. Additionally, a reference tag is added to the attachment file indicating the location of the attachment file. The attachment file will continue being moved and attached to the next earliest incidence of the e-mail until there is no further occurring incidence of the e-mail file to attach the associated attachment file to. Then, the attachment file will be deleted along with the last e-mail file with which it is associated to.

Referring to FIG. 3, step 304 follows from previous step 38 shown in FIG. 1a, and queries whether the user wishes to delete an existing e-mail file associated to an attachment file. The preceding query to delete an existing e-mail file 304 can be initiated through the preceding sequence of steps of the method shown, or can be independently initiated when, for example, a user wishing to delete e-mail messages and their associated attachments to increased space on a hard drive on the client's computer, proceeds to attempt to delete an e-mail file having an attachment. If the user does not wish to delete the existing e-mail file, then the next step 308 is to maintain the current file location and attachment file association. If the user does wish to delete the existing e-mail file then the next step 312 is to search for another incidence of the e-mail file having the next sequentially earliest date. When a next earliest e-mail file is found the next step 332 is to move the attachment file to the new location and associate and attach the attachment file to the next earliest dated incidence of the e-mail file. When there is no next earliest dated e-mail file found, the next step 320 is to query the user whether to delete the e-mail file along with the attachment file. If the user decides not to delete the e-mail file along with the attachment file, the next step 324 is to stop, if the user decides yes, the next step 328 is to delete both files.

While the present invention has been particularly described, in conjunction with a specific preferred Thus, having described the invention, what is claimed is:

1. A method for managing e-mail attachment files received via a network e-mail system by a user, comprising:
   receiving at a client computer a first e-mail including a first attachment file from said network e-mail system;
   opening said first e-mail at said client computer;
   comparing said first attachment file of said first e-mail with at least one existing second attachment file associated with a second e-mail file;
   determining whether said first attachment file is another incidence of said second attachment file;
   replacing said first attachment file with an identification which points to said second attachment file when said first attachment file is another incidence of said second attachment file;
   attaching a reference tag to said second attachment file indicating a file system location of said second attachment file;
   searching for a third e-mail file being a next earliest dated incidence of said second e-mail file when deleting said second e-mail file;
   moving and attaching said second attachment file to a third e-mail file being said next earliest dated incidence of said second e-mail file after said second e-mail file is deleted; and
   saving said first attachment file of said first e-mail file when said first attachment file is not another incidence of said second attachment file.

2. The method of claim 1 further comprising after opening said first e-mail file, selecting from an option menu to proceed with the remainder of the steps of said method for managing e-mail attachment files.

3. The method of claim 1 further comprising after said moving and attaching said second attachment file, deleting said second attachment file after not finding said third e-mail file being said next earliest dated incidence of said second e-mail file.

4. The method of claim 1 further comprising before receiving at a client computer a first e-mail, selecting at least one option from a menu displayed at said client computer.

5. The method of claim 4 wherein said menu includes a first option which includes saving all attachments.

6. The method of claim 4 wherein said menu includes a second option which includes automatically proceeding to the step of replacing said first attachment file with an identification which points to said second attachment file when said first attachment file is another incidence of said second attachment file, and said first attachment file is greater than about 0.5 MB.

7. The method of claim 1 further comprising after determining whether said first attachment file is another incidence, authorizing at said client computer saving and deleting first and second attachment files, and replacing said first and second attachment files with said identification.

8. The method of claim 1 wherein the step of opening said first e-mail includes, automatically proceeding with the remainder of the steps in said method for managing e-mail attachment files.

9. The method of claim 1 wherein the step of comparing said first attachment file includes, evaluating a date, a file name, and a file size for both said first attachment file and said second attachment file.

10. The method of claim 1 wherein the steps are performed in the sequence provided.

11. The method of claim 1 further comprising after said step of searching for a third e-mail file, selecting from a menu to proceed to the next sequential step.

12. A method for managing e-mail attachment files received via a network e-mail system by a user, comprising:
   selecting an option from an option menu at said client computer;
   receiving at a client computer, a first e-mail including a first attachment file from said network e-mail system;
   opening said first e-mail from said client computer;
   searching automatically for a second attachment file included with a second e-mail file after said opening said first e-mail;
   comparing said first attachment file with said second attachment file;
   determining whether said first attachment file is another incidence of said second attachment file;
   replacing said first attachment file with an identification which points to said second attachment file when said first attachment file is another incidence of said second attachment file;
   attaching a reference tag to said second attachment file indicating a file system location of said second attachment file;
   searching for a third e-mail file being a next earliest dated incidence of said second e-mail when deleting said second e-mail file;
   moving and attaching said second attachment file to said third e-mail file after finding said third e-mail file being said next earliest dated incidence of said second e-mail file, after said second e-mail file is deleted; and
   saving said first attachment file included with said first e-mail file when said first attachment file is not another incidence of said second attachment file.

13. The method of claim 12 further comprising after said step of opening said first e-mail, selecting from said option menu to proceed with the remainder of the steps of said method for managing e-mail attachment files.

14. The method of claim 12 further comprising after said step of moving and attaching said second attachment file, deleting said second attachment file after not finding said third e-mail file being a next earliest dated incidence of said second e-mail file.

15. The method of claim 12 further comprising after determining whether said first attachment file is another incidence, authorizing at said client computer saving and deleting first and second attachment files and replacing said first and second attachment files with said identification.

16. The method of claim 12 wherein opening said first e-mail automatically initiates proceeding with the remainder of the steps in said method for managing e-mail attachment files.

17. The method of claim 12 wherein the steps are performed in the sequence provided.

18. The method of claim 12 further comprising after said step of searching for a third e-mail file, selecting from an option menu to proceed to said next sequential step after finding said third e-mail file.

* * * * *